United States Patent [19]
Sechrist et al.

[11] Patent Number: 5,277,880
[45] Date of Patent: Jan. 11, 1994

[54] CATALYST REGENERATION APPARATUS WITH RADIAL FLOW DISTRIBUTION

[75] Inventors: Paul A. Sechrist, Des Plaines; William J. Koves, Hoffman Estates, both of Ill.

[73] Assignee: UOP, Des Plaines, Ill.

[21] Appl. No.: 826,498

[22] Filed: Jan. 27, 1992

Related U.S. Application Data

[63] Continuation-in-part of Ser. No. 652,838, Feb. 8, 1991, abandoned, which is a continuation-in-part of Ser. No. 193,319, May 11, 1988, abandoned.

[51] Int. Cl.$^5$ .............................................. B01J 8/12
[52] U.S. Cl. ................................. 422/216; 208/140; 208/165; 208/173; 422/218; 422/219; 422/220; 422/223; 422/239
[58] Field of Search ............... 422/216, 220, 218, 219, 422/223, 239; 208/140, 173, 165; 34/57B, 10, 168, 174

[56] References Cited

U.S. PATENT DOCUMENTS

| | | | |
|---|---|---|---|
| 2,614,033 | 10/1952 | Cornell et al. | 23/288 |
| 2,671,057 | 3/1954 | McClure | 252/418 |
| 3,647,680 | 3/1972 | Greenwood et al. | 208/65 |
| 3,652,231 | 3/1972 | Greenwood et al. | 23/288 G |
| 3,692,496 | 9/1972 | Greenwood et al. | 23/288 G |
| 3,716,969 | 2/1973 | Maeda | 55/390 |
| 3,745,112 | 7/1973 | Rausch | 208/139 |
| 3,838,038 | 9/1974 | Greenwood et al. | 208/108 |
| 3,978,150 | 8/1976 | McWilliams, Jr. | 260/683.3 |
| 4,333,751 | 6/1982 | Iwamura et al. | 55/390 |
| 4,349,362 | 9/1982 | Tanaka et al. | 55/390 |
| 4,438,288 | 3/1984 | Imai et al. | 585/379 |
| 4,506,032 | 3/1985 | Imai et al. | 502/223 |

Primary Examiner—Robert J. Warden
Assistant Examiner—Amalia Santiago
Attorney, Agent, or Firm—Thomas K. McBride; John G. Tolomei

[57] ABSTRACT

Apparatus for regenerating spent hydrocarbon conversion catalyst. Catalyst particles in a vertically-elongated movable tapered bed are contacted with a hot oxygen-containing gas stream in order to remove, by means of combustion, coke which accumulated on the catalyst particles while they were used in a hydrocarbon conversion zone. Catalyst moves downward under the influence of gravity. The catalyst bed is tapered such that the thickness of the bed, in a dimension which is transverse to the direction of catalyst movement, varies from a minimum at the top of the tapered bed to a maximum at the bottom of the tapered bed. Gas passes through the tapered bed in a direction which is substantially transverse to the direction of catalyst movement. Substantially, all of the catalyst in the bed is in contact with the flowing gas. The variation in bed thickness causes a varying gas flow rate through the bed, from a maximum flow rate at the top of the tapered bed to a minimum flow rate at the bottom of the tapered bed and reduces the time that catalyst is exposed to high temperature gases. This flow pattern results in the delivery of oxygen in a manner which more closely matches the oxygen requirement for combustion at each point in the tapered bed. Advantages of the invention include increased coke burning capacity and longer catalyst life. Catalytic reforming is an example of a hydrocarbon conversion process in which the invention may be advantageously employed.

7 Claims, 6 Drawing Sheets

Figure 9
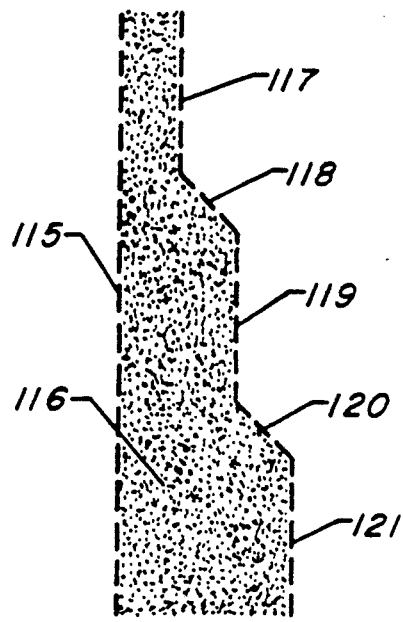
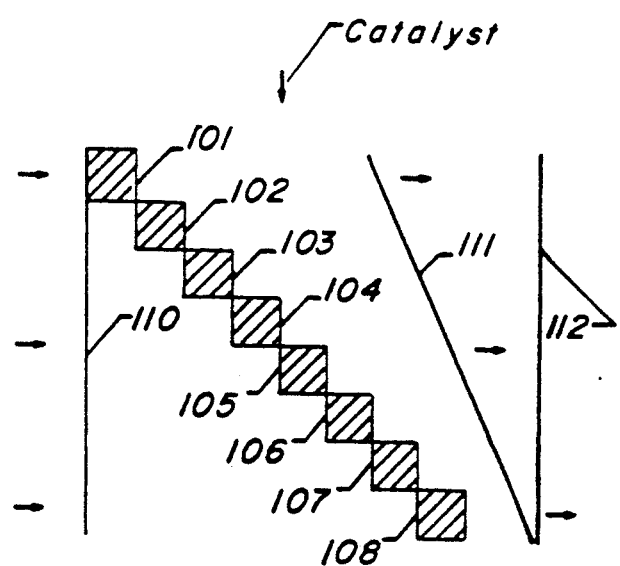
Figure 6

CATALYST REGENERATION APPARATUS WITH RADIAL FLOW DISTRIBUTION

CROSS-REFERENCE TO RELATED APPLICATIONS

This application is continuation in part of prior application U.S. Ser. No. 652,838, filed Feb. 8, 1991, now abandoned, which is a continuation in part of U.S. Ser. No. 193,319, filed May 11, 1988 now abandoned.

FIELD OF THE INVENTION

This invention relates to the art of catalytic conversion of hydrocarbons to useful hydrocarbon products. More specifically, it relates to the reconditioning of spent hydrocarbon conversion catalyst so that the catalyst can be reused in a hydrocarbon conversion reaction.

BACKGROUND OF THE INVENTION

Catalytic processes for the conversion of hydrocarbons are well known and extensively used. Invariably the catalysts used in these processes become deactivated for one or more reasons. Where the accumulation of coke deposits causes the deactivation, reconditioning of the catalyst to remove coke deposits restores the activity of the catalyst. Coke is normally removed from catalyst by contact of the coke containing catalyst at high temperature with an oxygen-containing gas to combust and remove the coke in a regeneration process. These processes can be carried out in-situ or the catalyst may be removed from a vessel in which the hydrocarbon conversion takes place and transported to a separate regeneration zone for coke removal. Arrangements for continuously or semi-continuously removing catalyst particles from a reaction zone and for coke removal in a regeneration zone are well known.

In continuous or semi-continuous regeneration processes, coke laden particles are at least periodically added and withdrawn from a bed of catalyst in which the coke is combusted. In those processes having an essentially linear progression of catalyst particles through the bed and a transverse flow of oxidizing gas coke combustion, there are regions of intense burning that extend through portions of the catalyst bed.

These regions vary the oxygen demands down the length of the bed so that a uniform gas addition across a surface of the bed will not provide the most effective utilization of the oxygen-containing gas. Inefficient utilization of the oxygen-containing gas raises overall gas demands which wastes equipment and energy. One of the ways in which gas is wasted is by variations in the oxygen demand that can permit oxygen to break through the catalyst bed. Therefore it would be generally desirable to direct the oxygen-containing gas to areas where it can be most effectively used to burn coke from the catalyst.

Another problem associated with localized regions of intense coke combustion is catalyst deactivation. Exposure of high surface area catalyst to high temperatures for prolonged periods of time will create a more amorphous material having a reduced surface area which in turn lowers the activity of the catalyst until it reaches a level where it is considered deactivated. Deactivation of this type is permanent, thereby rendering the catalyst unusable. When moisture is present—water is a by-product of the coke combustion—the deactivating effects of high temperature exposure are compounded.

The combination of temperature and exposure time determine the useful life of the catalyst. The burning of coke in localized portions of a catalyst bed has the deleterious effect of heating gases and generating moisture that pass through downstream portions of the bed and extend the high temperature exposure time of catalyst particles in the bed.

INFORMATION DISCLOSURE

U.S. Pat. No. 3,652,231 (Greenwood et al.) shows regeneration apparatus in which a constant-width movable bed of catalyst is utilized. '231 also describes a continuous catalyst regeneration process which is used in conjunction with catalytic reforming of hydrocarbons. U.S. Pat. Nos. 3,647,680 (Greenwood et al.) and 3,692,496 (Greenwood et al.) also deal with regeneration of reforming catalyst. These patents ('231, '680, and '496) are hereby incorporated in full into this patent application.

U.S. Pat. No. 3,838,038 lists exemplary hydrocarbon conversion processes with which moving bed regeneration apparatus may be used (column 6); the list includes hydrocracking and other hydroprocessing applications, isomerization, alkylation, and dehydrogenation.

In U.S. Pat. No. 3,978,150 (McWilliams), which discloses a process for catalytic dehydrogenation of saturated normal paraffins, especially those having two to six carbon atoms per molecule, a catalyst which may be regenerated in apparatus designed in accordance with '231 is used, though the halogenation section is not required (see column 7). Additional examples of dehydrogenation catalysts which may be regenerated using the apparatus of the present invention may be seen in U.S. Pat. Nos. 4,438,288 (Imai et al.) and 4,506,032 (Imai et al.).

U.S. Pat. No. 3,745,112 (Rausch) discloses a catalyst of broad utility which is preferably regenerated by means of a moving bed process which may be practiced in the apparatus of the present invention.

U.S. Pat. No. 2,671,057 (McClure) depicts a catalyst bed that rests at its angle of repose across partitions or along a vessel wall to taper the surface of a catalyst bed used in a hydrocarbon conversion or regeneration process.

U.S. Pat. Nos. 3,716,969 (Maeda), 4,349,362 (Tanaka) and 4,333,751 (Iwamura) depict apparatus for moving bed adsorption processes that use adsorbent beds having a greater thickness at the bottom than at the top.

BRIEF SUMMARY OF THE INVENTION

The present invention is an apparatus for effecting treatment needed to regenerate spent hydrocarbon conversion catalyst. Catalyst particles in a vertically-elongated movable tapered bed are contacted with a hot oxygen-containing stream in order to remove, by means of combustion, coke which accumulated on the catalyst particles while they were used in a hydrocarbon conversion zone. Catalyst moves downward under the influence of gravity. The catalyst bed is tapered such that the thickness of the bed, in a dimension which is transverse to the direction of catalyst movement, varies from a minimum at the top of the tapered bed to a maximum at the bottom of the tapered bed. Gas passes through the tapered bed in a direction which is substantially transverse to the direction of catalyst movement. Substantially, all of the catalyst in the bed is in contact with the flowing gas. The variation in bed thickness causes a varying gas flow rate through the bed, from a maximum flow rate at the top of the tapered bed to a minimum flow rate at the bottom of the tapered bed. This flow pattern results in the delivery of oxygen in a manner which more closely matches the oxygen requirement for combustion at each point in the tapered bed and eliminates catalyst bed sections that usually expose catalyst to high temperature gases. The advantages of a tapered bed stem from a recognition of the nature of coke combustion in a catalyst bed having a small width to length ratio. As the catalyst particles pass down the length of the bed, the oxygen-containing regeneration gas passes transversely through the bed. The upper portion of the catalyst bed contains a burn zone in the form of a wave front that starts at the end of the bed where coke-containing catalyst particles are added and an inlet surface where the transversely flowing gas first enters the bed. The wave front progresses down at least a portion of the bed length and slopes away from the inlet surface. Catalyst deactivation is diminished by reducing the duration or the temperature of the gases to which the catalyst particles behind the burn wave are exposed. The term "behind the burn wave" refers to the volume of catalyst particles located downstream, with respect to transverse gas flow through the bed, of the wave front. Oxygen utilization is enhanced by increasing the volume of gas passing through the upper portions of the burn zone relative to the lower portions. Increasing the gas flow through the catalyst particles located behind the burn wave provides more gas that can act as a heat sink to absorb the total release of heat by the combustion of coke. Therefore the temperature of the gas behind the wave front is reduced relative to the temperature produced by the gas flowing at a lower rate. The volume of catalyst behind the burn zone is also reduced by varying the thickness of the bed. Since the burn wave slopes away from the inlet face, using straight sides on the catalyst bed leaves an inverted frusto-conical volume of catalyst particles behind the burn wave. Varying the thickness of the bed along its axis removes a portion of the particles from this frusto-conical volume. By making the upper portion of the bed narrower relative to the lower portion, a reduced amount of catalyst particles are present for hot gases to pass through. At the lower end of the burn wave, catalyst particles located in front of the wave front are only exposed to the relatively cool temperature of the oxygen-containing gas as it enters the burn zone, therefore, bed thickness in this region does not promote increased deactivation. In addition, the thinner section of bed at the beginning portion of the wave front allows a higher gas velocity through that portion of the particle bed so that more oxygen is available for utilization where catalyst first enters the bed and oxygen demands are the greatest. Thus, the confinement of catalyst particles in the apparatus of this invention provides better utilization of the oxygen-containing gas during regeneration and reduces the duration of catalyst exposure to high temperature gases.

An important aspect of this invention is the thickness of the bed at top of the bed where the catalyst particles enter. In order to obtain the most benefit from this invention from the standpoint of catalyst life, the bed thickness at the top of the bed would not exceed the burn wave thickness. However, gas distribution over the height of the bed also influences the minimum bed thickness at a given point and the maximum acceptable bed thickness variation. A very thin width at the top of the bed would increase the gas velocity at this section relative to lower thicker sections of the bed. The high gas velocity at the very thin section could increase the gas velocity and generate excessive burn temperatures at this bed section. Of course, there is a self limiting aspect in setting the bed width to match the burn zone width. As combustion increases at a certain section so does the width of the burn zone. Therefore, increases in the gas velocity will increase the width of the burn wave which in turn increases the necessary thickness of the bed.

Moreover, process condition affect more than the width of the burn wave. In addition to the gas velocity through the bed, the rate of catalyst movement through the bed, the oxygen concentration of the recycle gas, and the coke loading on the catalyst all influence the angle as well as the width of the burn wave. For most common regeneration application where the gas velocity is in an average range of 1 to 3.5 ft/sec, catalyst is supplied to the bed at a rate of 500 to 2000 lbs per hour which results in a vertical velocity through the bed of from 2.5 to 5 feet/hr, the oxygen concentration of the recycle gas is in a range of from 0.5 to 1.5% by volume, and the catalyst contains about 5 to 7 wt. % coke, the burn wave will have a thickness of about 1 inch or less and will taper through the bed at an angle of about 1° to less than 6°. Therefore, the top of the bed will have a thickness of from 5 inches to 2 inches and preferably about 3 inches and the overall taper angle of the screen section is preferably in a range of from 2° to less than 6°.

After coke is burned off, catalyst may be treated in a halogenation zone, which is comprises of a downwardly extended portion of the tapered bed. The tapered catalyst bed may be continued into the halogenation zone or the downwardly extended portion of the bed may be of constant thickness. In either case, the thickness of the bed in the halogenation zone will be greater than the thickness utilized when a non-tapered catalyst bed is employed, resulting in an increased catalyst residence time in the halogenation zone. This is advantageous, as catalyst residence time in a particular halogenation zone may be a constraint on catalyst circulation rate. An increase in the rate of catalyst circulation allows the production rate of hydrocarbon conversion products to be increased.

In a commonly-used regeneration method, at least a portion of the treatment steps needed to regenerate spent hydrocarbon conversion catalyst take place in a vessel which is commonly called a regenerator, or regeneration vessel. Spent catalyst may be termed deactivated or used catalyst. Reactivation of catalyst refers to full or partial reactivation of the catalyst such that it may be used again to promote a reaction.

Practice of the invention offers other advantages over the use of a constant width bed. Modification of a constant bed-width regenerator in accordance with the invention will provide an increase in the allowable rate of coke burning, that is, an increase in regenerator capacity, as compared to an unmodified regenerator. This increase is available at a relatively low cost, compared with other methods of increasing capacity. Also,, both capital and operating costs are reduced in comparison with other methods of increasing capacity. With additional regenerator capacity available, the hydrocarbon conversion process may be operated at an increased severity and/or an increased rate. Practice of the invention thus provides an increased amount and/or quality of hydrocarbon products.

Another advantage resulting from practice of the invention is that the rate of loss of surface area of the catalyst is reduced. This extends the total life of the catalyst, thus permitting an increased number of use/regeneration cycles.

It is an object of this invention to increase the coke removal capacity of hydrocarbon conversion catalyst regeneration vessels.

It is also an object of this invention to increase the quantity and/or quality of hydrocarbon products produced in the hydrocarbon conversion zone utilizing catalyst regenerated in accordance with this invention.

It is also an object of this invention to effect savings in capital cost and operating cost of hydrocarbon conversion catalyst regeneration units.

It is a further object of this invention to reduce the rate of decline of surface area of hydrocarbon conversion catalyst which results from the reactivation procedure, thus increasing total service life.

In a broad embodiment, the invention comprises an apparatus for at least partially regenerating spent hydrocarbon conversion catalyst by the combustion of coke. The apparatus includes a vertically elongated vessel and a hollow form screen assembly for confining catalyst particles. The screen assembly has vertically extended inner and outer screen sections. At least one of the screen sections is at least discontinuously tapered in a vertical direction to provide a tapered screen section having an overall taper angle of less than 6°. Each of the screen sections have openings, smaller than the average diameter of the catalyst particles, that permit gas flow and confinement of catalyst particles. The screen sections extending vertically within the vessel and together form a vertically elongated catalyst bed section, for the combustion of coke, which is adapted to permit downward gravity flow of catalyst particles. The bottom of the screen section have an open bottom that permit an at least semi-continuous downward gravity flow of catalyst particles. At the top of the catalyst bed sections the screens are separated by a distance of no more than 5 inches.

The apparatus also includes means for adding catalyst particles to the top of the catalyst bed sections, means for withdrawing catalyst particles from the bottom of the catalyst bed section, a recycle gas distribution space extending without restriction from the top to the bottom of the catalyst bed section for distributing recycle gas about said inner screen section and a flue gas collection space extending from the top to the bottom of the catalyst bed section arranged for collecting flue gas from about the outer screen section. The bottom of the bed section has a substantially unobstructed opening for withdrawing catalyst. The gas spaces are arranged such that gas will flow in a substantially horizontal direction through said catalyst bed section.

The screen assembly for retaining the tapered catalyst bed may be formed of a vertical cylindrical outer catalyst retention screen and an inner catalyst retention screen in the shape of an inverted frustum of a cone. The screens extend substantially throughout the burn zone and are concentric with one another. The inner screen and said outer screen retain catalyst in the space formed therebetween and are concentrically disposed in the vessel to form the space for distributing recycle gas between the vessel sidewall and the outer screen, and the inner screen encloses a central space which comprises the space for collecting flue gas.

When catalyst is halogenated as a part of the regeneration process, the apparatus includes a catalyst halogenation zone comprising a downwardly extended portion of the regeneration vessel and the catalyst retention screens. The apparatus also defines halogenation gas distribution space formed between the outer screen and the vessel sidewall which is subadjacent to the recycle gas distribution space and includes a horizontal partition ring located in the halogenation gas distribution space and extending between the vessel sidewall and the outer screen to form an upper boundary of the halogenation gas distribution space, and a lower boundary of the recycle gas distribution space which substantially prevents gas flow between the halogenation zone gas distribution space and the recycle gas distribution space. In this form of the apparatus, at least one halogen inlet nozzle on the vessel which communicates with said halogenation gas distribution space. The apparatus also includes a halogenation gas collection space, comprising a central space enclosed by the inner screen; at least one halogen outlet nozzle and at least one halogen outlet conduit which is in communication with the halogen outlet nozzle and also in communication with the halogenation gas collection space; and means for collecting and diverting gas, located at the end of the halogen outlet conduit, to direct a first portion of gas flowing upward in the central space in the halogenation zone into the halogen outlet conduit and to direct a second portion of gas flowing upward in the halogenation zone into the catalyst feed.

Addition aspects, embodiments, advantages and details of this invention are disclosed in the following detailed description.

BRIEF DESCRIPTION OF THE DRAWINGS

FIG. 6 is a schematic representation of a burn wave across a catalyst bed.

FIG. 9 is a cross-section of another catalyst bed arrangement for use in the method of this invention.

DETAILED DESCRIPTION OF THE INVENTION

Figure 1:
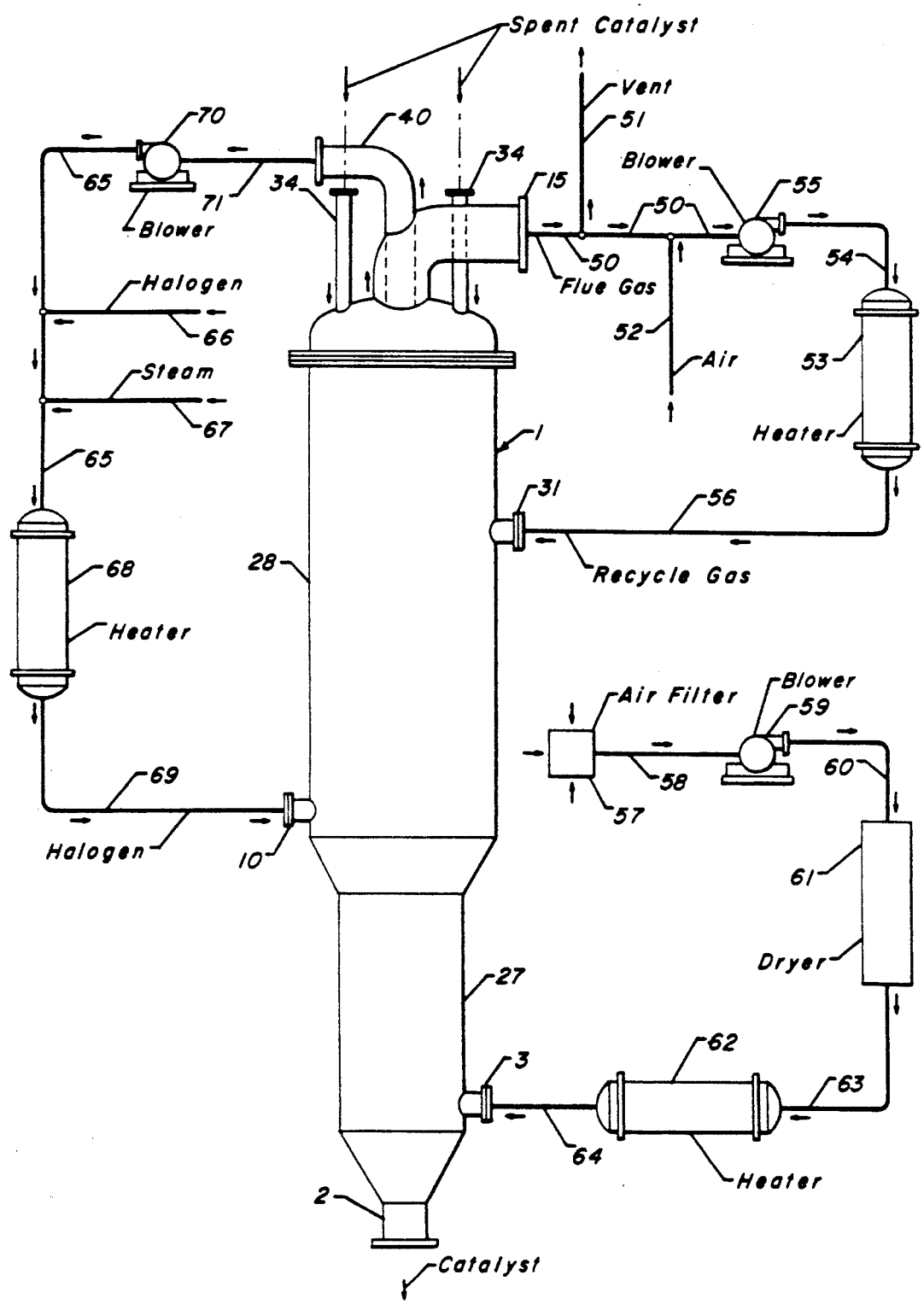
FIG. 1 is an arrangement for a regeneration process schematically showing the regeneration vessel and associated equipment.

The present invention is applicable to a number of hydrocarbon conversion processes which utilize a catalyst. For example, it is useful in the isomerization of normal butane to isobutane and the isomerization of mixed $C_8$ aromatics, including those of high ethylbenzene content, to meta-xylene or paraxylene. The present invention may also be used in upgrading light straight run naphtha, which is a mixture rich in $C_5$ and $C_6$ paraffins (pentanes and hexanes), to the corresponding branched isomers, which have higher octane numbers than the feed naphtha. Another hydrocarbon conversion process in which the present invention may be used is dehydrogenation of light paraffins ($C_2$-$C_5$, but primarily $C_3$ and $C_4$) to the corresponding olefins.

However, the most widely practiced hydrocarbon conversion process to which the present invention is applicable is catalytic reforming. Therefore the discussion of the invention contained herein will be in reference to its application to a catalytic reforming reaction system. It is not intended that such discussion limit the scope of the invention as set forth in the claims.

Catalytic reforming is a well-established hydrocarbon conversion process employed in the petroleum refining industry for improving the octane quality of hydrocarbon feedstocks, the primary product of reforming being motor gasoline. The art of catalytic reforming is well known and does not require detailed description herein.

Briefly, in catalytic reforming, a feedstock is admixed with a recycle stream comprising hydrogen and contacted with catalyst in a reaction zone. The usual feedstock for catalytic reforming is a petroleum fraction known as naphtha and having an initial boiling point of about 180° F. (80° C.) and an end boiling point of about 400° F. (205° C.). The catalytic reforming process is particularly applicable to the treatment of straight run gasoline comprised of relatively large concentrations of naphthenic and substantially straight chain paraffinic hydrocarbons, which are subject to aromatization through dehydrogenation and/or cyclization reactions.

Reforming may be defined as the total effect produced by dehydrogenation of cyclohexanes and dehydroisomerization of alkylcyclopentanes to yield aromatics, dehydrogenation of paraffins to yield olefins, dehydrocyclization of paraffins and olefins to yield aromatics, isomerization of n-paraffins, isomerization of alkylcycloparaffins to yield cyclohexanes, isomerization of substituted aromatics, and hydrocracking of paraffins. Further information on reforming processes may be found in, for example, U.S. Pat. Nos. 4,119,526 (Peters et al. ); 4,409,095 (Peters); and 4,440,626 (Winter et al.).

A catalytic reforming reaction is normally effected in the presence of catalyst particles comprised of one or more Group VIII noble metals (e.g., platinum, iridium, rhodium, palladium) and a halogen combined with a porous carrier, such as a refractory inorganic oxide. Alumina is a commonly used carrier. The halogen is normally chlorine. The particles are usually spheroidal and have a diameter of from about 1/16th to about ⅛th inch (1.5–3.1 mm), through they may be as large as ¼th inch (6.35 mm). In a particular regenerator, however, it is desirable to use catalyst particles which fall in a relatively narrow size range. A preferred catalyst particle diameter is 1/16th inch (3.1 mm). During the course of a reforming reaction, catalyst particles become deactivated as a result of mechanisms such as the deposition of coke on the particles; that is, after a period of time in use, the ability of catalyst particles to promote reforming reactions decreases to the point that the catalyst is no longer useful. The catalyst must be reconditioned, or regenerated, before it can be reused in a reforming process.

In preferred form, the former will employ a moving bed reaction zone and regeneration zone. The present invention is applicable to a moving bed regeneration zone. Fresh catalyst particles are fed to a reaction zone, which may be comprised of several subzones, and the particles flow through the zone by gravity. Catalyst is withdrawn from the bottom of the reaction zone and transported to a regeneration zone where a multi-step process is used to recondition the catalyst to restore its full reaction promoting ability. Catalyst flows by gravity through the various regeneration steps and then is withdrawn from the regeneration zone and furnished to the reaction zone. Movement of catalyst through the zones is often referred to as continuous though, in practice, it is semi-continuous. By semi-continuous movement is meant the repeated transfer of relatively small amounts of catalyst at closely spaced points in time. For example, one batch per minute may be withdrawn from the bottom of a reaction zone and withdrawal may take one-half minute, that is, catalyst will flow for one-half minute. If the inventory in the reaction zone is large, the catalyst bed may be considered to be continuously moving. A moving bed system has the advantage of maintaining production while the catalyst is removed or replaced.

When using the apparatus of this invention in a continuous or semicontinuous catalyst regeneration process, catalyst is contacted with a hot oxygen-containing gas stream containing gas stream (known in reforming processes as recycle gas) in order to remove coke which accumulates on surfaces of the catalyst while it is in a hydrocarbon conversion reaction zone. Coke is comprised primarily of carbon but is also comprised of a relatively small quantity of hydrogen. The mechanism of coke removal is oxidation to carbon monoxide, carbon dioxide, and water. Coke content of spent catalyst may be as much as 20% of the catalyst weight, but 5–7% is a more typical amount. After passing through a combustion zone, catalyst is usually passed into a drying zone for removal of water formed in the combustion zone which has remained on the catalyst instead of being carried off with combustion gases. Water removal is accomplished by passing a hot dry air stream through the catalyst. Catalyst is passed out of the regeneration vessel after combustion of coke and any required drying. The catalyst is usually subjected to additional treatment steps in order to complete the total regeneration process; an example of an additional step is contacting the catalyst with a gas comprised of hydrogen to effect reduction of metal catalyst components.

In order to dry catalyst in the regenerator, a dry air stream is introduced into the bottom of the regeneration vessel and flows upward, countercurrent to catalyst flow. After passing through the catalyst drying zone to accomplish removal of water, the air stream typically passes into a gas collection portion of the combustion zone, where it mixes with the gas produced by combustion and gases which have passed through the catalyst. This mixture, termed flue gas, is withdrawn from the combustion zone. Most regeneration processes mix at least a portion of this gas with air and recycle it back to the combustion zone to contact the catalyst and combust coke. Usually, the portion which is not recycled is simply vented to atmosphere.

In regeneration vessels where catalyst flows through a combustion section in an elongated constant-width bed and recycle gas is passed horizontally through the bed, the quantity of oxygen provided to each point on the inlet surface of the bed remains constant. A typical oxygen concentration in gas supplied to a combustion section is about 1% by volume. Examples of this type of combustion section may be seen in U.S. Pat. No. 3,652,231 (Greenwood et al.), which has been incorporated into this document by reference thereto. The concentration of oxygen at every point on the outer boundary of a catalyst bed, which is defined by an outer screen, is the same. More oxygen is consumed in the upper regions of the moving constant-width bed than in the lower regions. In the upper portion of the bed, gas exiting the bed contains no oxygen while in the lower portion of the bed only a portion of the oxygen passing through the bed is consumed. As mentioned above, this is an undesirable situation.

Practice of the present invention provides more oxygen to the portion of the catalyst bed where it is needed (the upper portion) and less oxygen to the portion of the bed where coke burning takes place at a relatively slow rate (lower portion). This is accomplished by varying the horizontal width of the bed, from a minimum width at the top of the burn zone to a maximum width at the bottom of the burn zone. This variation in bed width causes the flow of recycle gas through the bed to vary from a maximum at the top to a minimum at the bottom of the bed. Increased utilization of oxygen and the resulting increased rate of coke burning permits the rate at which catalyst is passed through the bed to be increased without changing the amount of coke remaining on the catalyst leaving the burn zone. The blower which provides recycle gas to the burn zone does not have to be increased in size in order to practice the invention and achieve a higher rate of coke removal.

Using this tapered configuration for the catalyst bed also results in a shorter residence time in the upper portion of bed, where catalyst reaches a peak temperature. The surface area of commonly used hydrocarbon conversion catalysts decreases as cumulative time during which the catalyst is exposed to hot gas is increased. The effectiveness of the catalyst decreases as the surface area decreases. Thus, practice of the present invention will extend the total life of the catalyst.

Figure 2:
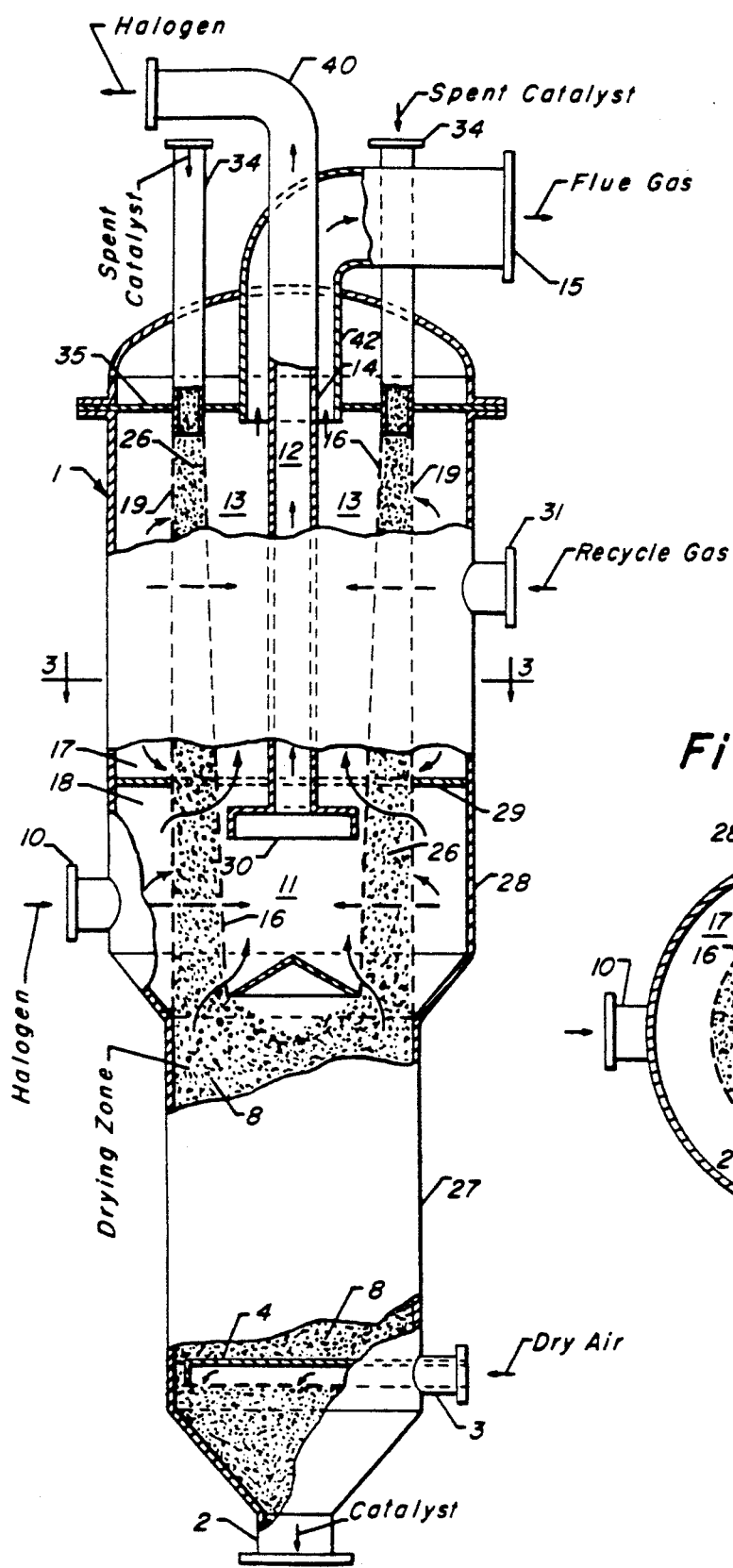
FIG. 2 is a cross-sectional elevation of the regeneration vessel of FIG. 1.
Figure 3:
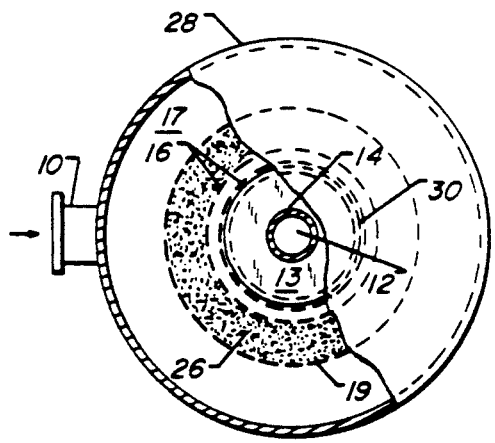
FIG. 3 is a transverse section of FIG. 2 taken at lines 3—3.

FIGS. 1 through 3 will now be utilized in describing a specific example of the invention; such use is not intended to limit the broad scope of the invention as presented in the claims. The Drawings show only elements and equipment which are essential to a clear understanding of the invention. Application and use of additional required items is well within the purview of one skilled in the art. U.S. Pat. Nos. 3,652,231, 3,647,680 and 3,692,496, which have been made a part of this document, may be consulted for additional detailed information.

Referring now to FIG. 1, spent catalyst particles are introduced into regeneration vessel 1 by means of nozzles 34. Though two catalyst inlet nozzles are shown, only one nozzle or multiple nozzles may be utilized. Catalyst is removed from regenerator 1 at the lower end through nozzle 2. Regenerator 1 has an upper section 28 and a lower section 27.

Flue gas leaves the upper section of the regeneration vessel through nozzle 15 and is conveyed to blower 55 by means of pipeline 50. A portion of the flue gas leaving the regenerator is vented from the system by means of pipeline 51. Air is added to the flue gas by means of pipeline 52. The gas stream may now be denoted "recycle gas". Recycle gas leaving blower 55 by means of pipeline 54 passes through heat exchanger 53 and pipeline 56 to enter the regenerator by means of nozzle 31. Heat exchanger 53 heats the recycle gas to carbon-burning temperatures.

FIG. 1 depicts a halogenation loop. As mentioned above, not all catalysts require a halogenation step as part of the regeneration process. A halogenation gas stream is provided to the halogenation section of the regenerator by means of nozzle 10. The halogenation gas exits the regenerator by means of nozzle 40 and is conveyed to heat exchanger 68 by pipelines 71 and 65 and by blower 70. Steam is added to the halogenation gas by means of pipeline 67. Makeup halogen is added through pipeline 66. After the halogenation gas is heated, it passes through pipeline 69 to regenerator upper section 28.

Air drawn from the atmosphere by blower 59 passes through air filter 57 and is conveyed to blower 59 by pipeline 58. The air stream passes from the blower to air dryer 61 by means of pipeline 60. After water is removed from the air stream in dryer 61, the air stream flows to heater 62 by means of pipeline 63. The air stream is heated in heater 62 and passed into lower regenerator section 27 via pipeline 64 and nozzle 3.

Referring now to FIG. 2, which shows the regenerator of FIG. 1 in greater detail and uses reference numbers from FIG. 1 where appropriate, there are two catalyst retention screens 16 and 19 within the upper section 28 of regeneration vessel 1. One of the catalyst retention screens, outer screen 19, is cylindrical in form. The other retention screen, inner screen 16, is tapered such that it forms a hollow inverted frustum of a cone without the top and bottom surfaces, the screen being the sidewall of the cone. The two catalyst retention screens have as their central axis the central axis of the regeneration vessel and are concentrically disposed in the upper section of the regeneration vessel. Screens 16 and 19 form a catalyst retention space through which a descending annular column 26, or bed 26, of catalyst moves by gravity. Catalyst inlet conduits which are downward extensions of nozzles 34 deliver catalyst at points spaced around the annular bed. The catalyst screens have openings sufficiently small to preclude catalyst particles from passing through the screens. For a description of catalyst retention means, U.S. Pat. No. 3,652,231 may be consulted. The catalyst retention screens extend throughout the upper section of vessel 1 and deliver catalyst to the lower section 27 of regenerator 1.

The portion of the upper section of vessel 1 which is above partition 29 is termed the burn zone, or combustion zone, where combustion of coke takes place. A space which serves to distribute recycle gas around the catalyst bed is formed between catalyst retention screen 19 and the sidewall of the upper section 28 of regeneration vessel 1 and is divided into two parts by partition 29. Recycle gas enters the uppermost gas distribution space, denoted by reference number 17, by means of recycle gas nozzle 31. Partition 29 forms a barrier between recycle gas distribution space 17 and a similar space which is denoted halogenation gas distribution space 18. Partition 35 provides a top closure for recycle gas distribution space 17. Recycle gas flows radially, or horizontally, from gas distribution space 17 through the catalyst retained between screens 16 and 19 to a central space 13, a portion of which is occupied by halogen conduit 14. A lower boundary for central space 13 is provided by end portion 30 of conduit 14. Partition 35 constitutes a top closure for central space 13 as well as gas distribution space 17. Conduits 42 and 14 and the catalyst delivery conduits 34 pass through partition 35. Central space 13 is termed flue gas collection space. Conduit 42 is an extension of nozzle 15 within the vessel and conduit 42 is in communication with gas collection space 13. Conduit 14, which is an extension of nozzle 40, passes through conduit 14 and collection space 13 but is not in communication with either.

The portion of upper regenerator section 28 which extends below partition 29 is termed the halogenation zone. A gas comprising a halogen enters the zone via halogenation nozzle 10, flows into halogenation gas distribution space 18, and then flows through the catalyst in a radial manner, entering halogenation zone central space 11. In certain applications, it is not necessary to utilize a halogenation zone and partition 29, halogen inlet nozzle 10, halogen outlet nozzle 40, and halogen outlet conduit 14 are omitted. Partition 29 is the top boundary of distribution space 18 and the lower boundary is formed by the necked-down portion of the regenerator at the bottom of upper section 28. End portion 30 of conduit 14 forms the upper boundary and end closure 32 forms the lower boundary of collection space 11.

Screen 19 extends into the lower section 27 of vessel 1, which is of a smaller diameter than the upper section, as can be seen in FIG. 2. The outside diameter of screen 19 at its lower end is slightly smaller than the inside diameter of the chamber lower section and the screen projects a short distance into the lower section. Catalyst discharged from the annular space between the catalyst retention screens fills all of lower section 27 of vessel 1. Catalyst moves downward through the lower section of the vessel and out of the vessel by means of catalyst outlet nozzle 2.

Nozzle 3 on regeneration vessel 1 is equipped with means for distributing air 4 to various points in a horizontal plane which is perpendicular to the descending catalyst, so that air will flow uniformly up the column in contact with all of the catalyst 8 in lower section 27, which may be denoted the drying zone. The means for distributing air depicted in FIG. 2 is a perforated pipe extending into the vessel via nozzle 3 and held in place by a flange bolted to the flange of nozzle 3. A more elaborate arrangement of perforated pipes may be used or other means for distributing air may be used.

Air entering the vessel via distributor 4 has been dried so that it contains no more than about 5 parts per million (by volume) of water and has also been heated. The hot air passes upwardly through the catalyst located in the drying zone, removing moisture which is contained on the catalyst. Essentially all of the air moving up the column lower section passes into the central space enclosed by catalyst retention screen 16 which is denoted halogenation gas collection space 11. The air stream from the drying zone mixes with gas which has passed through the catalyst from distribution space 18 to collection space 11 and the combined stream enters halogen conduit 14 to flow out of the regeneration vessel via halogen nozzle 40. The vessel is designed so that substantially all of the gas in central space 11 enters conduit 14. This is accomplished by providing flow directing means, such as the enlarged end portion of conduit 14 which is denoted by reference number 30. By substantially is meant between 80% and 100% of the air entering central space 11.

FIG. 3 is a top section view of vessel 1, taken as shown in FIG. 2. Halogen conduit 14 is centered on the vertical axis of the vessel. Catalyst retention screens 16 and 19 enclose the downward moving bed of catalyst 26. The taper of bed 26 is depicted in FIG. 3 by the smaller diameter dashed circle labelled with reference number 16, which depicts the inner boundary of the bed at a location below the section plane of FIG. 3. Gas in gas distribution space 17 flows radially through the catalyst to the central space 13 which is defined by screen 16 and also contains conduit 14. The interior of conduit 14 is denoted by reference number 12. End portion 30 of conduit 14 can also be seen in this view.

A portion of halogenation gas which passes through the bed in the halogenation zone enters central space 13, since the end portion 30 of conduit 14 is located below partition 29 (see FIG. 2). Gas passing through the catalyst in the burn zone provides the oxygen for combustion of carbon on catalyst in the burn zone and then mixes with the portion of upwardly flowing gas from the halogenation zone that did not enter conduit 14 and the mixture flows out of the vessel by means of nozzle 15.

Figure 4:
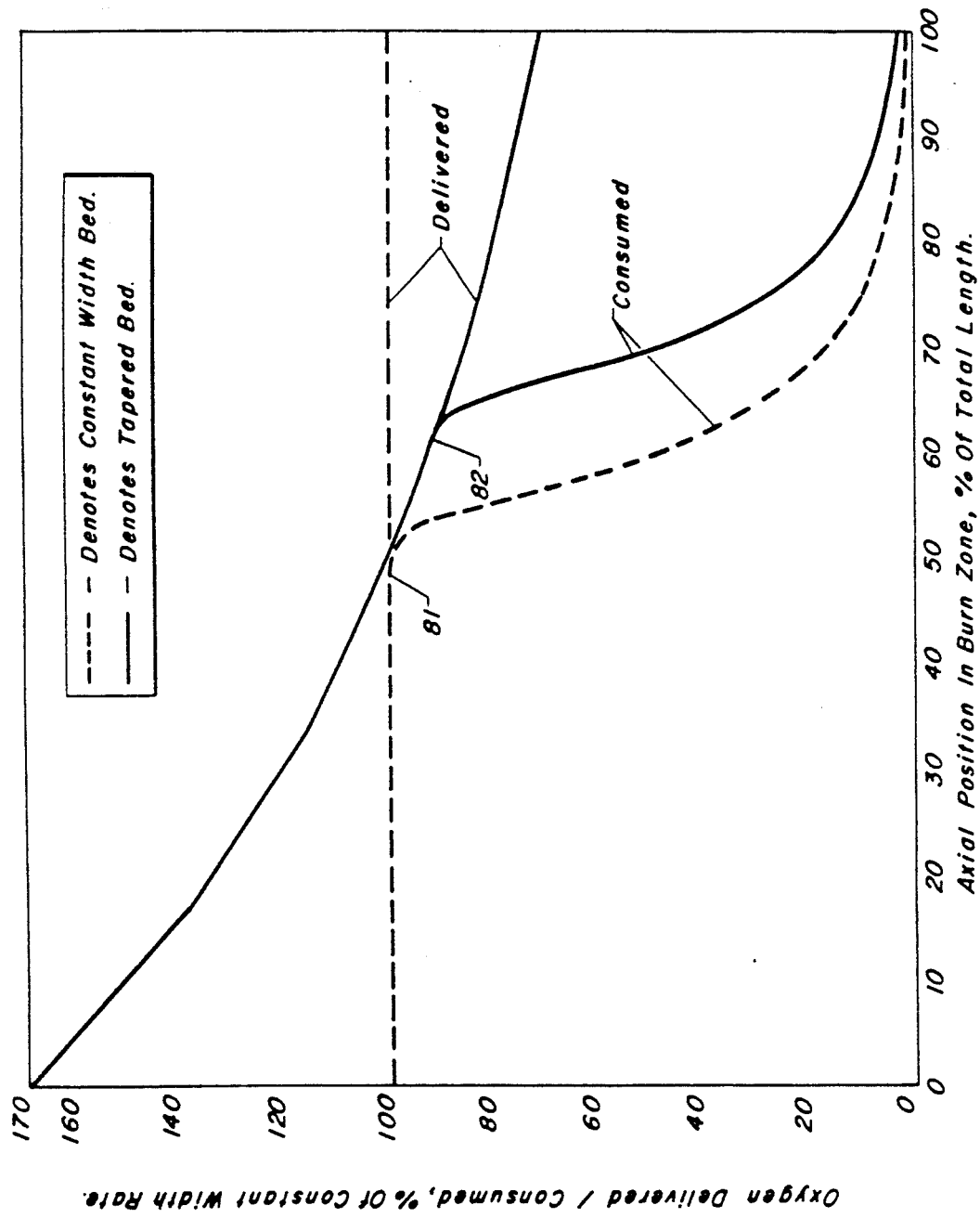
FIG. 4 is a graph showing oxygen delivery and consumption as a functioned of bed position.

The amount of oxygen delivered and consumed in both a constant-width bed and a tapered bed is shown by FIG. 4. The tapered bed is as depicted in FIG. 2 and the constant-width bed is identical to the tapered bed except for the bed thickness dimension. In the example from which FIG. 4 is drawn, the constant-width bed has a horizontal thickness of 6 inches (15.2 cm) and is annular in form, the catalyst being retained between a cylindrical inner screen and a cylindrical outer screen. The tapered bed has a thickness of 3 inches (7.6 cm) at the top of the bed and 9 inches (22.9 cm) at the lower boundary of the burn zone. The thickness of the bed is measured in a direction transverse to the direction of catalyst flow.

The rate of catalyst movement through a 6 inch (15.2 cm) constant-width bed or a tapered bed varying from a 3 inch (7.6 cm) thickness to a 9 inch (22.9 cm) thickness may range from as little as 200 pounds per hour (90.7 kg) to 1000 pounds per hour (453.6 kg) or more. Typical bed lengths for this range of catalyst flow rate are from about 4 feet (1.22 m) to about 20 feet (6.1 m). The diameter of the inner catalyst retention screen at the top will often be in excess of 36 inches (0.91 m), in order to accommodate a 36 inch flue gas pipe. Where larger catalyst movement rates are required, bed thickness may be increased. For example, for a 2000 pound per hour (907.2 kg) catalyst flow rate, a constant-width bed may be 9 inches (22.86 cm) thick and a tapered bed from 4 to 5 inches (10.16–12.7 cm) thick at the top to 12 to 14 inches (30.48–35.56 cm) thick at the bottom. Bed length will be about 13 feet (5.15 m). Therefore for the bed of this example it has a taper angle of about 2°.

The amount of oxygen delivered to every point on the leading edge of the constant-width bed of FIG. 4 is the same; therefore, plotting the rate of oxygen delivery versus the location of delivery along the length (vertical) of the bed yields the dashed horizontal line of FIG. 4. It is implicit in this plot that rate of delivery at any point around the circumference at the same axial position is the same. The total amount of oxygen delivered in a unit of time is also represented by the area under the horizontal dashed line extending from the top of the burn zone at the vertical axis to the bottom of the burn zone at the 100% location on the horizontal axis. The leading edge of the bed is the cylindrical exterior surface of the bed which is first contacted by recycle gas flowing to the bed. The gas flux at the leading edge, or flow rate of gas into the bed, is substantially the same at every point because the bed thickness is uniform, the pressure drop for gas flowing from the inlet nozzle to every point on the leading edge of the bed is small, compared to the pressure drop for gas flowing through the bed, and the pressure drop for gas flowing from every point on the downstream side of the bed to the outlet conduit is similarly small. That the thickness of the bed (6 inches, 15.2 cm) is uniform results in the gas flow across the bed being a constant; that is, for every gas path through the bed, the rate of gas flow is a constant.

All of the oxygen supplied to an upper region of the bed is consumed, since an abundant amount of coke is present. As catalyst particles move downward in the bed and coke is removed from them, a point is reached where less than all of the oxygen delivered is consumed. This is termed the breakthrough point and is shown by reference number 81 for the constant-width bed. Breakthrough occurs at a location spaced from the top of the bed by a distance of about 48.5% of the total length of the bed in the burn zone. It is known to those skilled in the art that catalyst particles of the type used in the hydrocarbon conversion processes of this invention have a large surface area, which results from the existence of a multiplicity of pores. When the catalyst particles reach the breakthrough point in the bed, the coke left on the surface of the particles is deep within the pores and therefore the oxidation reaction occurs at a much slower rate. This is illustrated by the portion of the curve (for oxygen consumed in the constant-width bed) to the right of the breakthrough point which rapidly falls off and then asymptotically approaches zero oxygen consumed. The amount of oxygen consumed after the breakthrough point is a fraction of that consumed in the bed above the breakthrough point. The vertical distance between the curve representing the amount delivered and the curve representing the amount consumed shows the amount of oxygen wasted at each position in the bed. It can be seen that a significant amount of the oxygen delivered to the bed is not consumed.

The coke content of catalyst exiting the bed is approximately 0.2% of the weight of the catalyst. Much of this residual coke is burned off in the halogenation zone or, if the halogenation zone is omitted, in the drying zone. Were catalyst leaving the combustion section to have on it a larger amount of coke, the temperature in the section below the combustion section would rise to an unacceptably high value, as a result of the heat of combustion.

Referring now to the tapered bed depicted in FIG. 2 and operationally represented by the curves of FIG. 4, gas flow through the bed is characterized as radial and transverse to the direction of movement of catalyst. Like the pressure loss for gas flow from inlet nozzle 31 through gas distribution space 17, the pressure drop for gas exiting the bed and flowing to outlet conduit 42 is low. Therefore the pressure drop across the bed at a particular bed elevation is a constant. There is no significant difference in pressure drop through coked catalyst as compared to fresh catalyst. The gas flow rate is related to the length of the flow path, through the bed which in the arrangement of FIG. 2 is the horizontal width, or the thickness of the bed. Thus, the gas flow rate decreases as bed width increases.

Since flow rate varies inversely with bed thickness, it can be seen that the amount of gas flowing through the tapered bed is at a maximum at the top of the bed and a minimum at the bottom of the bed. This is shown in FIG. 4 by the oxygen delivery curve for the tapered bed. Oxygen delivered at the very top of the bed is 170% of the amount delivered to a constant width bed. The amount of oxygen delivered decreases as the bed thickness increases, equalling the amount delivered to a constant width bed at about the 50% point, that is, about halfway down the bed from the top. There is no significance to the location of this crossover point being near the breakthrough point of the constant-width bed. At the bottom of the tapered bed, the oxygen delivered is about 72% of that delivered to a constant width bed.

Compared to the constant-width bed, the extent of the combustion reaction in the tapered bed is greater in the top portion of the tapered bed, since the amount of oxygen supplied is greater, and the reaction is limited by oxygen delivery at this point in the bed. In the lower portion of a tapered bed, the combustion is less, since the amount of oxygen supplied is less. However, since combustion takes place at a much lower rate in the lower portion of the bed due to the low rate of oxygen diffusion into the innermost catalyst pores, the available oxygen is not a limiting factor.

Reference number 82 denotes the breakthrough point for the tapered bed. At that point, the oxygen consumed begins to diverge from the oxygen delivered. The oxygen breakthrough point is located much further down the length of the tapered bed than it is in the constant-width bed: about 62%, compared to 48.5%. The increased amount of oxygen used in the tapered bed and thus the increased amount of coke burned is easily seen by noting the difference in areas under the two curves for oxygen consumed. Also, the amount of oxygen supplied to the tapered bed but not used is represented by the area between the solid-line curves to the right of breakthrough point 82. That the amount of oxygen which passes unused through the constant-width bed is greater is illustrated by the curves for the tapered bed being contained totally within the dashed-line curves right of constant-width bed breakthrough point 81, the area between the dashed-line curves representing unused oxygen.

Figure 5:
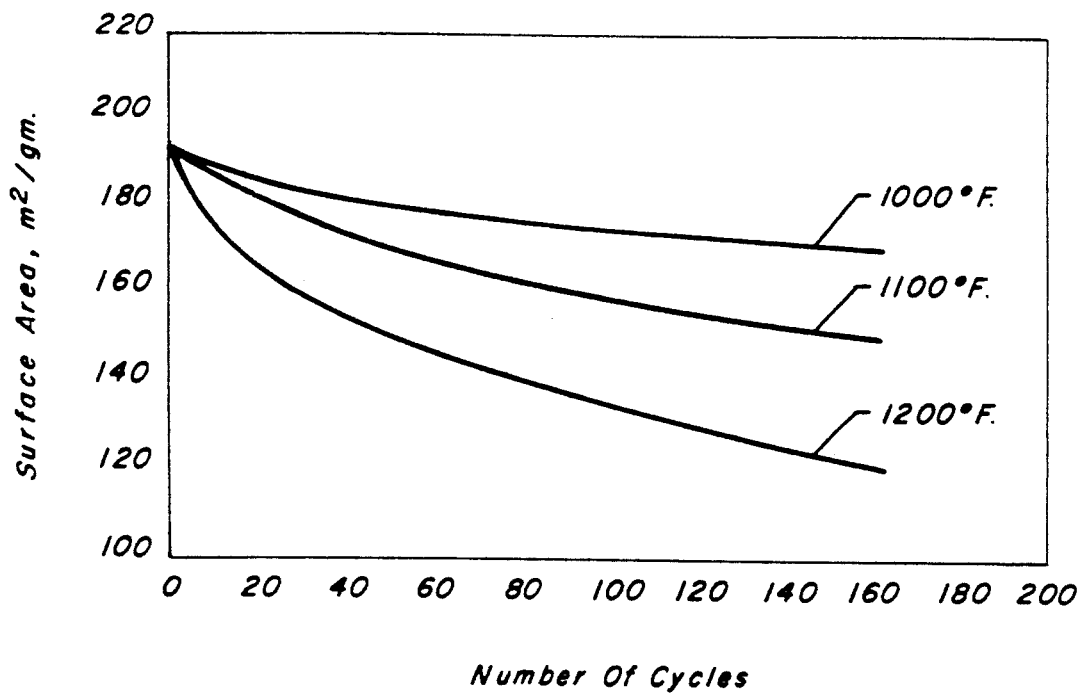
FIG. 5 is a graph showing the surface area loss on a catalyst as a function of regeneration cycles for a number of regeneration temperatures.
Figure 7:
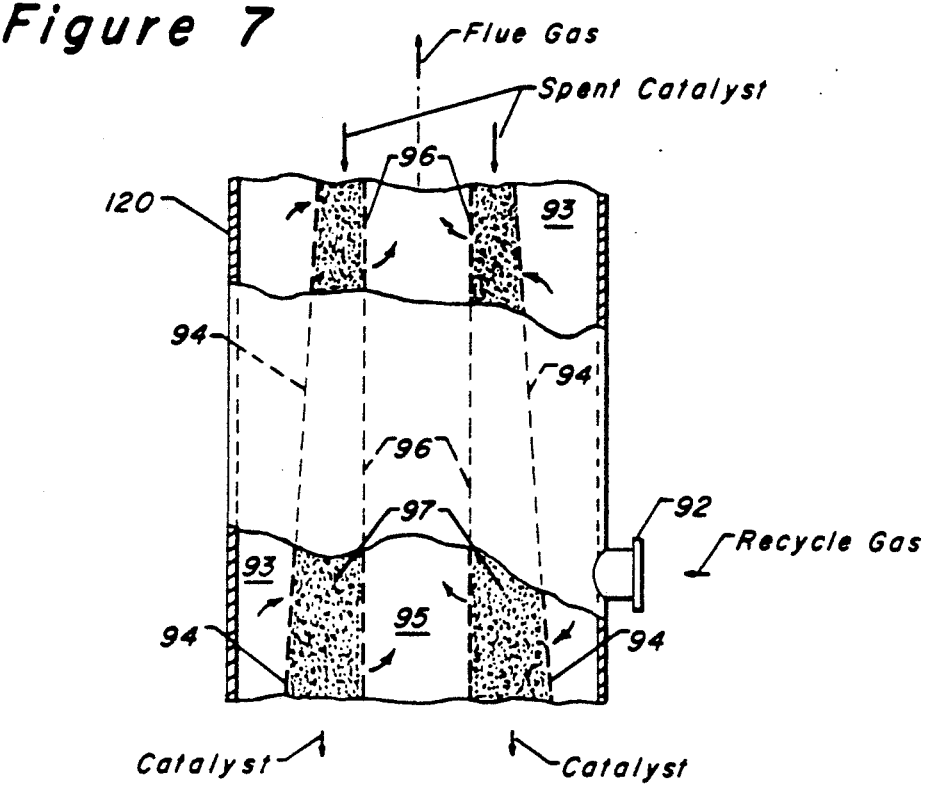
FIG. 7 is a cross-sectional view schematically showing an alternate arrangement for a catalyst bed of this invention.
Figure 8:
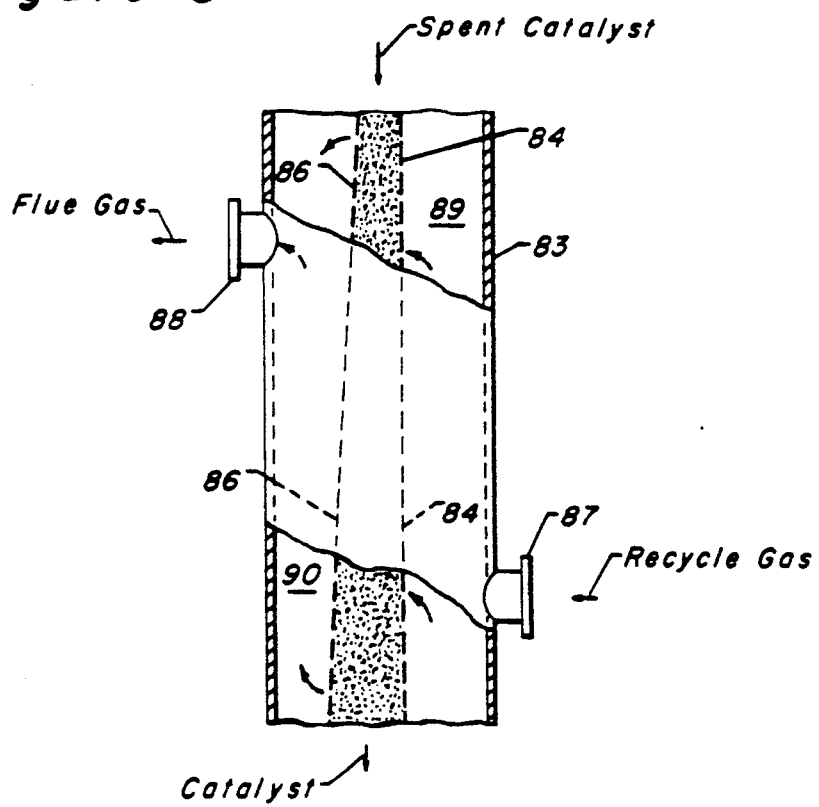
FIG. 8 is a cross-section view schematically showing another alternate arrangement for a catalyst bed of this invention.

FIG. 5 depicts the results of experimental work in which changes in surface area of catalyst were studied. It is well known that the effectiveness of catalyst in promoting a hydrocarbon conversion reaction declines as surface area declines. A first batch of catalyst was subjected to numerous use and regeneration cycles. The peak catalyst temperature reached during each regeneration of this batch was 1000° F. (540° C.). It can be seen from FIG. 5 that the surface area of the catalyst declined as the number of use and regeneration cycles increased. A second batch of catalyst was processed in the same way, but the maximum catalyst temperature during each regeneration was 1100° F. (595° C.). A third batch was allowed to attain peak temperatures of 1200° F. (650° C.). It can be seen from FIG. 5 that the surface area of catalyst decreases upon exposure to hot gas and that the rate of decrease is related to length of exposure and gas temperature.

FIG. 6 is a schematic representation of the progression of a burn front through a portion of a catalyst bed. The drawing depicts a vertical section of the top portion of a moving bed of catalyst of the type depicted in FIG. 2. Catalyst is confined between outer screen 110 that provides an inlet face for the bed and tapered inner screen 111 that provides an outlet face for the bed. Line 112 represents an inner screen of a constant width bed. Gas flow through the catalyst is depicted by the horizontal arrows. The vertical arrow shows downward catalyst flow. The burn front is approximated by cells 101 through 108. The width and the height of each cell is shown in hatched cross-section. The tapers of the cells as well as the screen 111 are exaggerated to facilitate visualization.

The gas stream passes horizontally through the bed. The height of a cell is chosen arbitrarily to represent a discrete vertical unit down the bed. The width of each cell represents that portion of catalyst containing sufficient oxygen and coke to support vigorous combustion. In the idealized form of this representation, oxygen deficient gas, heated by combustion, continues its horizontal flow path from a cell until it reaches the outlet face of the bed. As the bed moves downward, substantially coke-free catalyst will leave the bottom of a given cell 101 and be replaced by spent catalyst that enters from the top of the cell. Gas that continuously enters the bed supplies the oxygen to combust coke as catalyst is replaced in a cell.

Consider now a horizontal slice of the bed containing cell 102. Catalyst located to the left of cell 102 has passed through cell 101 and therefore is free of coke. Gas entering the bed from the left of cell 102 cools the catalyst leaving cell 101 and provides oxygen to remove coke from the catalyst in cell 102. Oxygen-free gas at its peak temperature leaves cell 102 and passes through the catalyst to the right of cell 102. Each of the cells 103-108 have a progressively larger width of regenerated catalyst in the left of the cell and a progressively smaller width of coke-containing catalyst to the right of the cell. Therefore when the bed has a uniform width, catalyst that enters the bed at or near the outlet face is exposed to high temperature gas and moisture until it reaches the bottom of the burn front.

FIG. 6 illustrates that hot gas exposure time for catalyst behind, i.e., to the right of burn front, is shorter in the tapered bed than in the constant-width bed. Looking at cell 101, hot gas flows through nearly twice the volume if it exits the bed at screen 112 (constant-width bed) rather than at screen 111 (tapered bed). Thus, the reduced high temperature exposure time lessens the surface area decline of the catalyst in a tapered bed versus that experienced for the catalyst in a constant-width bed.

Large benefits can be obtained from this invention with the use of a small taper behind the burn front. Catalyst that would be positioned against the outlet face of a constant-width bed experiences an extended exposure to high temperature gas. This exposure is also referred to as heat soak. Due to the extended heat soak caused by its position, catalyst moving closest to the outlet face experiences the most surface area decline. Therefore as the upper width of the catalyst is decreased, the volume of catalyst particles having the most susceptibility to surface area decline are removed first. As a result, a small effective taper, as little as 2° from the vertical, can greatly reduce the average heat soak time and surface area from the loss of the catalyst. In most operations, a taper in a range of from 2° to 5° is preferred. Of course, the taper angle will depend on the total length of the bed in the combustion zone. But in all uses the taper angle will be much less than the angle of repose of a static catalyst bed. Therefore the screen assemblies are necessary to actively confine the catalyst.

Steeper taper angles are not usually desirable since not all of the coke on a differential volume of catalyst is burned off instantly. As previously mentioned, some coke is located deep within the pores of the catalyst particles such that it is not instantly contacted with a sufficient amount of oxygen for complete burning. The rate of combustion of the coke left on the catalyst located below the burn front of FIG. 6 is much slower and oxygen demands below the burn front can be as much as 5-10 times lower than the oxygen demands along the burn front. Therefore while, the maximum catalyst temperature is reached during the first stage of coke burning along the burn front, it is still necessary to have sufficient oxygen-containing gas contact the catalyst below the burn front. For this reason, the maximum thickness of the catalyst bed below the burn front will not normally exceed three times the minimum bed thickness in the area of the burn front.

As mentioned above, catalyst temperatures which are commonly employed vary widely. A typical catalyst temperature at the top of the burn zone is about 890° F. (475° C.). It might rise to a peak of about 1100° F. (595° C.) and start falling at the breakthrough point to a temperature in the range of about 900°-1000° F. (480°-540° C.). The thickness of the catalyst bed, characteristics of the catalyst particles, and gas flow rate are factors that determine the pressure drop for a gas flow path through a particular bed. Practice of the present invention is not dependent upon any particular numerical values. Average superficial gas velocities across the bed will typically be in a range of 1.0 to 3.5 ft/sec. Maximum gas velocities are limited by catalyst pinning which holds the catalyst against the outlet screen and prevents downward catalyst movement. Variations in bed thickness will vary the superficial velocity between upper and lower portions of the combustion zone by 150 to 250%. Commonly used pressure drops may range from 0.5 to 10 psi (3.4 to 68.9 kPa).

In addition, practice of this invention does not required confinement of the catalyst particles in a smooth taper. Catalyst retention screens may be fabricated such that bed thickness increases in a stepwise manner. FIG. 9 illustrates the cross-section of a stepped bed configuration. Screen 115 can represent an outer or inner catalyst retention screen and screen sections 117, 199, and 121, can represent the other of the inner or outer catalyst retention screens. Screen sections 117, 119, and 121 are spaced apart from screen 115 at progressively increasing distances to vary the thickness of a catalyst bed 116 located between the screen sections. Angled screen elements 118 and 120 provide transitions between vertical sections 117 and 119, and 119 and 121. The sections in FIG. 9 can extend horizontally in a straight line to provide flat bed surfaces or may curve to give the bed surfaces cylindrical or elliptical profiles.

What is claimed is:

1. Apparatus for at least partially regenerating spent catalyst particles used in hydrocarbon conversion reactions by the combustion of coke which is comprised of:
   (a) a vertically-elongated vessel;
   (b) a hollow-form screen assembly located in said vessel having vertically extended inner and outer sections, at least one of said sections being tapered in a vertical direction to downwardly progressively increase the horizontal distance between the inner and outer screens and provide a tapered screen section having an overall taper angle of from 1 to less than 6°, that permit gas flow and confinement of catalyst particles, said screen sections extending vertically within said vessel and together forming a vertically elongated catalyst bed section therebetween for the combustion of coke, said bed section having an open bottom to permit an at least semi-continuous downward gravity flow of catalyst particles, said tapered screen section providing a horizontal distance between surfaces of adjacent screen sections that includes a distance of no more than 5 inches at the top of said catalyst bed section and each of said screen sections having openings;

(c) means for adding catalyst particles to the top of said catalyst bed section;

(d) means for withdrawing catalyst particles from the bottom of said catalyst bed section;

(e) at least one of said screens defining a recycle gas distribution space extending without restriction from the top to the bottom of said catalyst bed section for distributing recycle gas about one of said outer screen section of said inner screen section and a flue gas collection space extending from the top to the bottom of said catalyst bed section arranged for collecting flue gas from about the other of said inner screen section or said outer screen section, said distribution and collection spaces being arranged such that gas will flow in a substantially horizontal direction through said catalyst bed section;

(f) means for supplying recycle gas to said distribution space; and (g) means for withdrawing flue gas from said collection space.

2. The apparatus of claim 1 wherein at least one of said inner and outer screen sections has a frusto-conical surface, said screen sections are concentric with one another and one of said recycle gas distribution space and said flue gas collection space lies between a sidewall of said vessel and said outer screen section, and said inner screen section encloses a central space which comprises the other of said recycle gas distribution space and said flue gas collection space.

3. The apparatus of claim 2 wherein said apparatus includes a catalyst halogenation zone defined by downwardly extending portions of said vessel and said screen assembly, said downwardly extending portion of said screen assembly includes downwardly extending sections of said inner and outer screen sections that define a second catalyst bed section directly below and in vertical alignment with said first mentioned catalyst bed section, said inner and outer screen sections extend through said first mentioned bed section and said second bed section and said halogenation zone further comprises:

(a) a halogenation gas distribution space, positioned subadjacent to said recycle gas distribution space, defined by the space between said downwardly extending outer screen section and a sidewall of said downwardly extending vessel portion;

(b) a horizontal partition ring located between said halogenation gas distribution space and said recycle gas distribution space, and extending between said sidewall and said downwardly extending outer screen section to form an upper boundary of said halogenation gas distribution space and a lower boundary of said recycle gas distribution space which substantially prevents gas flow between the halogenation gas distribution space and said recycle gas distribution space;

(c) at least one halogen section nozzle on said vessel which communicates with said halogenation gas distribution space;

(d) a halogenation gas collection space, defined by a central space enclosed by said downwardly extending inner screen section;

(e) at least one halogen outlet nozzle in communication with said halogenation gas collection space and at least one halogen outlet conduit communicating said halogen outlet nozzle with said halogenation gas collection space;

(f) means for gas collection and gas diversion which are located at the end of said halogen outlet conduit to direct a first portion of gas flowing upward in said central space in the halogenation zone into said halogen outlet conduit and to direct a second portion of gas flowing upward in the halogenation zone into said first mentioned bed section; and (g) a bottom closure for occluding the bottom of said halogenation gas collection space.

4. The apparatus of claim 3 wherein said halogenation zone includes a necked-down portion of said vessel sidewall defining a lower boundary of said halogenation gas distribution space.

5. The apparatus of claim 1 wherein said inner screen section is a vertically extending, cylindrical screen and said outlet screen section is formed in the shape of a frustum of a cone, said screen sections are concentrically located in said vessel and said flue gas collection space lies between a sidewall of said vessel and the outer screen section, and said inner screen section encloses a cylindrical central space defining said recycle gas distribution space.

6. The apparatus of claim 1 wherein said outer screen section is comprised of a vertically extending, cylindrical screen, and said inner screen section is composed of at least two vertically extending, cylindrical screens, and at least one transition screen member, said inner screens each having a diameter less than the diameter of said outlet screen section and a concentric disposition within said outer screen section, where each of said inner screens, except the topmost has an inner screen of a larger diameter disposed above it, and said transition member is disposed between inner screens to confine catalyst and form said catalyst bed section.

7. The apparatus of claim 1 wherein said first distance is no more than 3 inches.

* * * * *